March 7, 1967 E. L. NIEDZIELSKI ET AL 3,307,330
DIFFUSION PROCESS AND APPARATUS
Filed April 30, 1965 2 Sheets-Sheet 1

INVENTORS
EDMUND LUKE NIEDZIELSKI
ROBERT ERVIN PUTNAM

BY *Harry E. Braddock*
ATTORNEY

March 7, 1967     E. L. NIEDZIELSKI ETAL     3,307,330

DIFFUSION PROCESS AND APPARATUS

Filed April 30, 1965                                          2 Sheets-Sheet 2

INVENTORS
EDMUND LUKE NIEDZIELSKI
ROBERT ERVIN PUTNAM

BY

ATTORNEY

United States Patent Office 3,307,330
Patented Mar. 7, 1967

3,307,330
DIFFUSION PROCESS AND APPARATUS
Edmund Luke Niedzielski, Graylyn Crest, Wilmington, and Robert Ervin Putnam, Wilmington, Del., assignors to E. I. du Pont de Nemours and Company, Wilmington, Del., a corporation of Delaware
Filed Apr. 30, 1965, Ser. No. 452,259
4 Claims. (Cl. 55—16)

This invention relates to the field of separating certain gases from gas mixtures containing them by utilizing the different rates of diffusion or permeation of the individual gases through a solid non-porous membrane or barrier. This general operation has been disclosed in an article by R. M. Barrer entitled "Activated Diffusion in Membranes" reported in Transactions of the Faraday Society, vol. 35, pp. 644–656 (1939), and has been disclosed in U.S. Patents 2,540,151, 2,540,152, 3,062,905, 2,597,907, and 3,019,853. More specifically, this invention involves an improved process and aparatus for making such separations.

A number of such process and apparatus arrangements have been described in the prior art. Many materials have been disclosed as the non-porous barrier or membrane in which the separation of the components of a gas mixture is accomplished. These known materials have included certain metals, glasses, and a number of organic polymeric compositions. These prior art materials have certain defects and disadvantages in their use as separation barriers. The metals used have been rather expensive and difficult to put in the most desirable physical form for effective operation. Glass separation barriers due to their fragile character present serious problems relating to fabrication, operation and maintenance of gas separation apparatus in which they are used. In addition, glasses appear to be limited to certain gas separations involving almost exclusive permeation by the small molecule gases such as hydrogen and helium. The organic polymeric materials, known to the prior art, while less costly and less difficult to handle than metals or glasses, nevertheless leave room for much improvement, primarily in the area of increased permeation rates while at the same time maintaining suitable selectivity levels or improving them also.

It has been discovered that certain materials used in a gas separation arrangement as the medium in which the differential permeation rate separation step occurs, or as the membrane or barrier element in gas separation apparatus operating according to this principle, result in a surprisingly great improvement in gas separations and overcome to a great extent many of the defects, disadvantages, and problems encountered in the prior art gas separation processes and apparatus of this general type. One of the significantly improved aspects of process and apparatus arrangements embodying principles of this invention and using these certain materials is a tremendous increase in the permeation rate for a first group of gases. Coupled with this is a significant reduction in the permeation rate for a second group of other larger molecule gases which actually, for the two groups of gases, results not only in higher selectivity for separations involving separating any one of the first group from mixtures containing it and any of the second group, but also for the separation allows higher throughput of the gas being separated. This is a highly significant result in terms of improving efficiency while reducing size, cost, and complexity of gas separation arrangements operating on the differential permeation principle. In certain separations also embodying principles of this invention, the permeation rates for the second group of gases are simply not increased as much as, or in proportion to, the increased permeation rates of the first group which still results in significant improvement in selectivities and throughput. Even where the selectivity for a given separation remains the same, or decreases within limits, but the rates of permeation and throughout are increased, this also can be an important improvement. This discovery makes possible gas separations of the selective or differential permeation type at concurrent levels of permeation rate and throughput and of selectivity not contemplated, approached, or achieved by the prior art.

The discovery or invention is believed to have an embodiment as a new, useful, and vastly improved gas separation process arrangement, and another embodiment as a new, useful, and vastly improved gas separation apparatus arrangement. These embodiments are disclosed in detail in the following description and covered by the claims. Generally, the discovery or invention involves accomplishment of differential permeation gas separations, of gases such as helium, hydrogen, oxygen, nitrogen, carbon dioxide, carbon monoxide, nitronic oxide, and argon from mixtures with larger molecule gases, in a process arrangement of steps or apparatus arrangement of means utilizing as a medium for the selective permeation, a non-porous body of a polymeric composition comprising repeating units of perfluoro(2-methylene-4-methyl-1,3-dioxolane) and from 0% to about 90% by weight, free-radical, polymerizable, unsaturated, halogenated, hydrocarbon repeating units. Preferably, the weight percent is from about 70% to 85% of the halogenated hydrocarbon units.

Further significance of the discovery or invention, as well as additional benefits and advantages will be apparent from the following specification and accompanying drawings wherein.

FIGURES 1–5 indicate various suitable applications or embodiments of the present discovery or invention, and these will be discussed first as to their general structures and general methods of operation.

Figure 1:
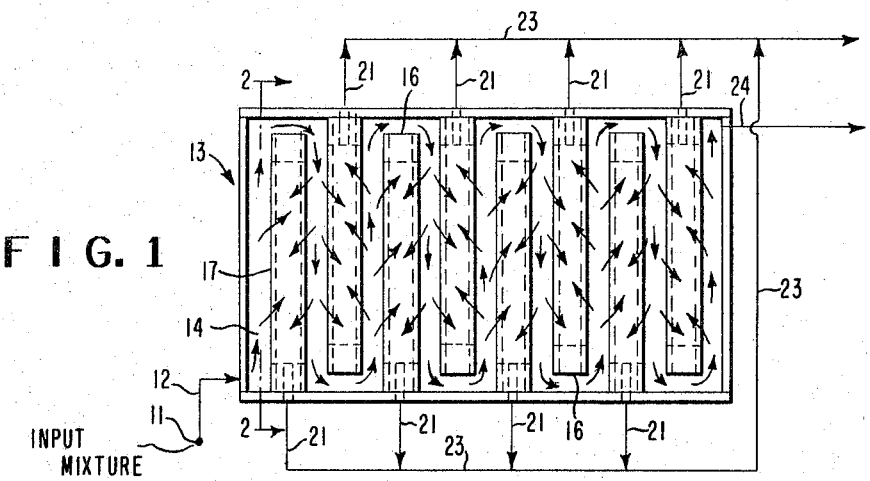
FIGURE 1 is a diagrammatic cutaway view of one form of differential permeation apparatus using flat film type permeation barrier elements and capable of carrying out the separation process according to the present invention.

Referring to FIGURE 1, an initial gas mixture is the feed or input mixture of gases which is to be separated. This mixture is passed from source 11 by way of line 12 into the interior of permeation vessel 13. In this embodiment the feed mixture is introduced under pressure. The interior portion of the permeation vessel 13 into which this mixture is introduced is called the feed zone 14 of the permeation apparatus. Within the permeation vessel are positioned a number of permeation cells 16. These permeation cells have a hollow interior. The cells are completely sealed off from the feed zone 14 and none of the fluid in feed zone 14 can pass therefrom into the hollow interior of the permeation cells 16 except by permeating through the permeation membrane structure 17 which forms two faces of each permeation cell. The permeation membrane structures 17 would be films of a polymeric composition comprising repeating units of perfluoro-(2-methylene-4-methyl-1,3-dioxolane) and from 0% to about 90% by weight free-radical, polymerizable, unsaturated, halogenated, hydrocarbon repeating units. The permeation cells are alternately suspended from the bottom and the top of permeation vessel 13 so as to provide a tortuous path for the input mixture as it progresses from the inlet 12 to a point which is remote from the inlet and from which the non-permeated portion is withdrawn. Since one of the gases permeates preferentially through the permeation membranes 17, it is obvious that the concentration of this gas in the mixture in the feed zone will diminish as the mixture passes along the tortuous path and is withdrawn as the non-permeate portion. The purpose of the tortuous path is to minimize backmixing, for backmixing tends to reduce the degree of separation that is attainable.

A lower pressure is maintained within the interior (permeate zones 19) of permeation cells 16. This permeating mixture has a higher concentration of the one gas than the concentration of the one gas in the feed mixture introduced from source 11. The permeated portions are rapidly withdrawn from permeate zones 19 of each of the permeation cells 16 and are passed by way of lines 21 into headers 22. These headers 22 are connected by line 23 and the permeated portion is withdrawn therefrom, and passed to storage. By permeating this permeated portion through one or more additional permeation stages, permeate fractions can be recovered therefrom which are substantially pure. The non-permeated portion is withdrawn from permeation vessel 13 by way of line 24. It may also be processed in subsequent permeation stages to recover additional amounts of the one gas therefrom and/or to recover a non-permeated portion highly rich in the other gases of the initial mixture.

Figure 2:
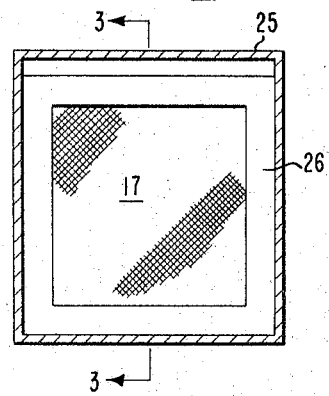
FIGURE 2 is a cross-sectional view taken along lines 2—2 of the apparatus shown in FIGURE 1 and shows one permeation unit in detail.

Referring now to FIGURE 2, permeation vessel 13 is depicted herein as being of square or rectangular cross section. It may be of circular or other shape if desired, since the shape has no bearing upon the operation or effectiveness of the process. The thickness of permeation vessel 13 is depicted herein by 25. Retaining ring 26 holds permeation membrane 17 in place within the permeation cell 16.

Figure 3:
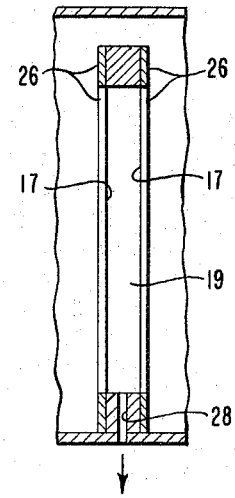
FIGURE 3 is a cross-sectional view taken along lines 3—3 of the unit shown in FIGURE 2.

FIGURE 3 shows an enlarged cross section of permeation cell 16 which is taken along lines 3—3 of FIGURE 2. Spacer ring 27 separates the two permeation membranes 17 which are positioned on opposite sides of spacer ring 20. Retaining rings 26 are of the same shape as spacer ring 27 and compress permeation membranes 17 against retaining ring 26 thereby forming a leak-proof permeation cell through which the gases cannot pass except by permeating through membranes 17. A passage way 28 through the bottom of spacer ring 27 permits permeate vapors within permeate zone 19 to pass down through the passage way into connecting line 21 by which the gases pass into manifolding line 22. When a large pressure differential is maintained between the feed zone and the permeate zone, a membrane supporting means may be positioned within the permeate zone to provide support for permeation membranes 17. This supporting means may take the form of a porous solid, close-mesh screen or the like.

Figure 4:
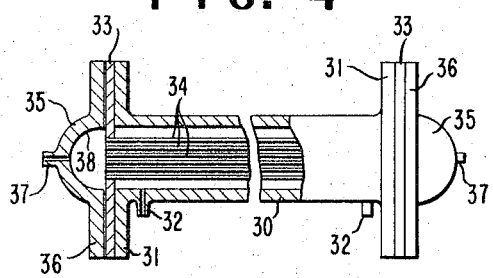
FIGURE 4 is a side elevational view, with certain parts broken away, of another form of differential permeation apparatus using tubular barrier elements as another suitable embodiment of this invention.

FIGURE 4 represents a preferred embodiment or application of the present discovery or invention and shows a differential permeation gas separation apparatus with a design similar to that of a conventional tube-in-shell heat exchanger. The apparatus comprises a rigid cylindrical shell or housing 30 preferably made of steel and provided with end flanges 31 and inlets or outlets 32 providing access to the interior of the housing. A plurality of tubes 34 are suspended between and secured at the ends thereof, preferably by heat sealing, to tube sheets 33. The tubes 34, and the tube sheets 33 if desired, may be made of a polymeric composition comprising repeating units of perfluoro-(2-methylene-4-methyl-1,3-dioxolane) and from 0% to about 90% by weight free-radical, polymerizable, unsaturated, halogenated, hydrocarbon repeating units. The ends of the tubes 34 are open and in free communication with end chambers 38 formed between the tube sheet 33 and end cap members 35. The end cap members 35 are provided with inlets or outlets 37 and are secured to the tube sheets 33 and flanges 31 of the housing by means (not shown) such as bolts connecting flanges 36 of the end cap members with the tube sheets and end flanges 31 of the housing. The input gas mixture may be supplied through one element 32 and removed through the other with the permeated gas withdrawn from one or both ends by means 37. The actual sizes are not critical and will vary with given separations involving specific gases. However, maximum effective membrane surface area of minimum thickness for a given shell volume is readily achievable by using very small tubes with very thin walls in the apparatus.

Figure 5:
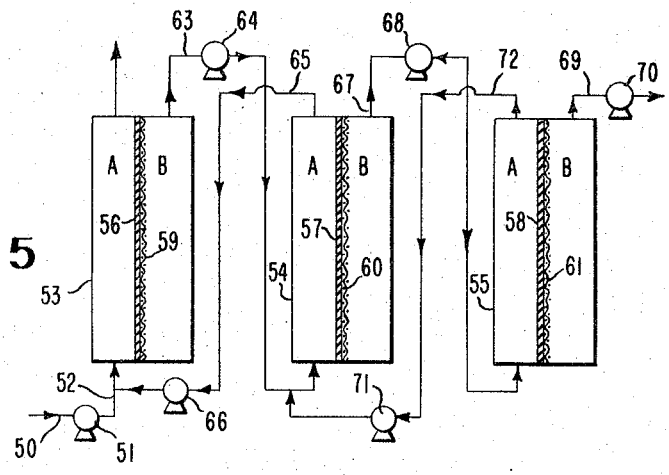
FIGURE 5 is a diagrammatic illustration of a multistage gas separation arrangement suitable as an embodiment of the present invention.

As shown in FIGURE 5, a charge of the input gas mixture to be diffused or permeation separated is drawn through conduit 50 by the pump 51 and forced into conduit 52 and thereby introduced into a diffusion chamber or separation zone 53.

There may be a plurality of diffusion chambers or separation stages such as the one 53, and in this present description there are illustrated the additional diffusion chambers or separation stages 54 and 55 which are arranged in series.

The several diffusion chambers 53, 54, and 55 are each internally divided into portions or zones A and B by longitudinally disposed division members, or septa, 16, 17, and 18, respectively which are in the form of thin membranes formed of a polymeric composition comprising repeating units of perfluoro-(2-methylene-4-methyl-1,3-dioxolane and from 0% to about 90% by weight free-radical, polymerizable, unsaturated, halogenated, hydrocarbon repeating units, and which may be supported upon suitable members such as the wire supports 59, 60, and 61 if desired.

The inlet mixture of gas from which the concentrate or one desired gas is to be removed is initially introduced into the zone A of the diffusion chamber 53 and therein, under pressure of the pump 51, and of pump 66 as will presently be explained, it comes in contact with the membrane 56, and a part of the inlet mixture or gas charge, is diffused or permeated through the membrane into the zone B, or exit side, of the chamber 53.

That part of the original gas charge, or the part not capable of penetrating the membrane 56 will leave the chamber 53 and the zone A thereof through the discharge conduit 62.

From the exit side of chamber 53, or the zone B thereof, the diffusate or permeated mixture is drawn through a conduit 63 by the pump 64 and forced under pressure into the inlet side, or zone A, of the chamber 54 wherein the pressure upon the gas will force a portion of it through the membrane 57 and into the outlet side, or zone B of the chamber. In a portion A of the chamber 54 all gas not penetrating the membrane 57 is withdrawn through the conduit 65 and forced by the pump 66 into the conduit 52 to be recharged into the zone A, or inlet side, of the first chamber 53.

Thus it will be appreciated that the diffusate from the first stage of the process, or from the zone B of the chamber 53 serves as the charging gas, or raw stock, for the second stage of the process effected in chamber 54. In this manner the mixture of gas constituting the charge which is fed to zone A of chamber 53 is under pressure by virtue of the function of pumps 51 and 66, and a greater pressure thereof exists in zone A than in zone B of the chamber 53 because of pump 64 which withdraws the diffusate from zone B by way of conduit 63. By this manner of maintaining a higher pressure in zone A than in zone B of the chamber 53, and in the zones A and B of all subsequent diffusion chambers to be described, namely, chambers 54 and 55, the concentrates of desired gas are readily collected from the mixture of gases as the concentrates are positively forced, and/or drawn through membranes.

From the outlet side of chamber 54 or the zone B thereof, the diffusate is withdrawn through the conduit 67 by the pump 68 and forced under pressure into the inlet side, or zone A, of chamber 55 wherein the gas contacts the membrane 58 and a portion thereof passes therethrough into the zone B, from whence it is withdrawn through conduit 69 as the product. Pump 70 may be interposed in conduit 69 to facilitate the withdrawal of the product from the zone B, and assist in maintaining it at a lower pressure than zone A. All gas in zone A of chamber 55 which does not penetrate the membrane 58 is withdrawn therefrom by the pump 71 through the conduit 72 and forced into conduit 63 which leads into zone A of chamber 54 wherein they are reprocessed. Obviously, multistage separations and apparatus are adaptable to use of membranes in either flat film form or in the form of tubes.

The preparation and properties, especially those relating to gas separations, of the polymeric composition which forms the improved membrane barrier of this invention and in which the differential improved permeation separation process of this invention occurs will next be discussed and various illustrative examples presented.

The following two procedures were used to make the permeation rate measurements set forth hereinafter. The permeation rate measurements were made at room temperature.

(A) ASTM Method D-1434-56T, using the "Dow" Cell with relatively low gas pressures. The rate of permeation was calculated from changes in pressure in an almost constant small volume.

(B) A volumetric procedure using a variation of the "Dow" Cell with gas pressures up to about 50 atmospheres. The rate of permeation was calculated from the rate of movement of a fluid droplet in a capillary tube or burette at constant pressure. This procedure was particularly useful in determining steady-state permeation rates with relatively thick membranes of high permeability.

Permeation rates constants are given in terms of a unit, the centi barrer (cB) with the dimensions:

$$\text{one } cB = 10^{-12} \frac{\text{ml.} \times \text{cm.}}{\text{sec.} \times \text{cm.}^2 \times \text{cm. Hg}}$$

based on a suggestion by Alter (J. Poly. Sci. 57, 925, 1962) that the "Barrer" unit (1 $B=100$ $cB$) be used instead of the more common basic unit giving the volume (in milliliters) permeating through a film of given thickness (in centimeters) and area (in square centimeters) per second with a given pressure difference (in centimeters of mercury). The arithmetic ratios of permeation rate constants are generally accepted as a measure of the separations obtainable in selective or differential permeation separation processes. These ratios are referred to as "separation factors" or as an indication of the selectivity of a given gas separation process.

A detailed disclosure and description of the basic component of the compositions involved in the process and apparatus of this invention is given in a U.S. patent application of the common assignee filed on even date herewith in the name of Edward Moonan Squire and entitled "Perfluoro(2-methylene - 4 - methyl-1,3-dioxolane) and Polymers Thereof" (AD-4058).

The starting material, perfluoro(2,4 - dimethyl - 1,2-fluoroformyl-1,3-dioxolane), is prepared by reacting perfluoropyruvyl fluoride ($CF_3COCOF$) with hexafluoropropylene epoxide at a temperature of around 0° C. in the presence of an inert polar organic solvent and cesium fluoride catalyst to form an adduct which is heated to a temperature between about 100°–200° C. Perfluoropyruvyl fluoride is, in turn, prepared by reacting hexafluoropropylene epoxide with an aromatic carbonyl compound such as benzophenone.

A typical preparation of perfluoropyruvyl fluoride is as follows: Into a 500-ml. three neck flask containing a gas inlet tube, a mechanical stirrer and a gas outlet tube is placed 200 gm. of benzophenone. The gas outlet tube is connected to two cold traps in series. The first trap is maintained at −10° C. and the second trap at −80° C. during the reaction. The reaction flask is heated to, and maintained at 225° C., while hexafluoropropylene epoxide is passed through the vigorously stirred benzophenone at 80 ml. per minute. The reaction is carried out five hours and then stopped. The combined reaction product from both traps weighs 150 gm. This product consists of a small amount of trifluoroacetyl fluoride, about 30 gm. of unreacted hexafluoropropylene epoxide and the remainder is perfluoropyruvyl fluoride. The perfluoropyruvyl fluoride is purified by fractional distillation. The purified product has a boiling point of 9° to 10° C.

A procedure for the preparation of perfluoro(2,4-dimethyl-2-fluoroformyl-1,3-dioxolane) is as follows: Into a 200 ml. flask containing a magnetic stirrer is placed 3 gm. of cesium fluoride and 20 ml. of the dimethyl ether of diethylene glycol. The flask is cooled to 0° C. and 44 gm. of perfluoropyruvyl fluoride is added. The reaction mixture is kept at 0° C., and hexafluoropropylene epoxide, 50.6 gm., is gradually added. The reaction proceeds rapidly during the addition of the epoxide consuming the epoxide as rapidly as it is added. The reaction mixture is then transferred to a steel lined autoclave and heated for five hours at a temperature of 140° C. The lower layer of the resulting product is distilled and yields perfluoro(2,4-dimethyl - 2 - fluoroformyl - 1,3-dioxolane) boiling point 60.5° C. in 70% yield. Perfluoro(2,4-dimethyl - 2 - fluoroformyl - 1,3 - dioxolane) was passed through a loosely packed bed of 8–14 mesh dried sodium carbonate in an 8″ x 3¼″ diameter vertical Pyrex tube maintained at a temperature of 295° C. in a current of nitrogen. The perfluoro(2,4-dimethyl - 2 - fluoroformyl-1,3-dioxolane) was fed at a rate of 0.02 mole per hour and the nitrogen was fed at a rate of 100 ml. per minute. The contact time was thus about 35 seconds. The product gas collected in a cold trap and consisted of perfluoro (2-methylene-4-methyl-1,3-dioxolane), boiling point 44.8° C. The conversion was 100% and the yield was 96–99.4% theoretical.

*Analysis.*—Calculated for: $C_5F_8O_2$: C, 24.6%; F, 62.3%. Found: C, 24.9%; F, 62.3%.

The infrared and nuclear magnetic resonance spectra of the compound are in accord with the structure:

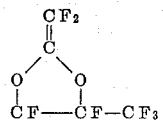

60.5° C. in 70% yield.

EXAMPLE I

This example illustrates preferred preparation and performance of a separation step and a separation membrane element of this invention made of a homopolymer of perfluoro(2-methylene-4-methyl-1,3-dioxolane).

A glass Carius tube was evacuated, cooled to −78° C. and charged with 32.9 g. of perfluoro(2-methylene-4-methyl-1,3-dioxolane) and 0.003 g. of nitrogen fluoride ($N_2F_2$), as a mixture of the cis- and trans-isomers. The tube was sealed and upon warming to room temperature an exotherm was observed with a temperature rise to 32° C. The polymerization was allowed to proceed at room temperature for 16 hours. The tube was opened and there was obtained 31.0 g. of polymer. The polymer was found to be soluble in a fluorocarbon solvent sold under the trade name FC–75 and believed to be consisting predominantly of perfluorinated alkylfuranes. The inherent viscosity of 0.5% solution in FC–75 was found to be 1.22 at 29° C. The polymer could be compression molded at 275° C. and 600 p.s.i. into a clear, colorless, transparent film having a tensile strength at 23° C., 2830 p.s.i. and an elongation of 1.7%.

*Analysis.*—Calculated for: $(C_5F_8O_2)_n$: C, 24.6%; F, 62.3%. Found: C, 24.7%; F, 62.2%.

A film 4.17 mils thick of this material was obtained by pressing at 250° C. and about 600 p.s.i. Permeation measurements by the volumetric procedure (B) and separate gases gave the following data for a membrane element formed from the film.

| Gas | Pressure, p.s.i. | Permeability Constant, cB | Separation Factor |
|---|---|---|---|
| Helium | 60 | 64,800 | $He/CH_4$=327.4. |
| Methane | 400 | 198 | |
| Ethylene | 400 | 113 | |
| Hydrogen | 150 | 23,700 | $H_2/CH_4$=120.1. |
| Oxygen | 300 | 4,030 | |
| Nitrogen | 400 | 970 | $O_2/N_2$=4.2. |
| Carbon dioxide | 300 | 6,660 | |
| Carbon monoxide | 400 | 794 | |
| Ammonia | 130 | 270 | |
| Nitrous oxide | 200 | 2,100 | |
| Argon | 400 | 1,960 | |

Permeation measurements by the volumetric procedure, with analysis of the permeated gases, gave the following data (compositions are by volume):

| Gas Mixture | Pressure, p.s.i. | Initial Mixture | Permeated Mixture | Permeability Constants | | Separation Factor |
|---|---|---|---|---|---|---|
| $CO_2/CH_4$ | 500 | 50:50 | 96.4:3.6 | 6,040 | 210 | 28 |
| $O_2/N_2$ | 500 | 21:79 | 44:56 | 3,180 | 1,030 | 3.1 |
| $O_2/N_2$ | 900 | 21:79 | 45:55 | 3,050 | 970 | 3.15 |

EXAMPLE II

This example illustrates an alternate preparation and the performance of a separation step and a separation membrane structure of this invention made of a homopolymer of perfluoro(2 - methylene - 4 - methyl-1,3-dioxolane). The homopolymer was prepared in accordance with the procedure of Example I. A film 1.9 mils thick was obtained by evaporating a solution of this polymer in perfluorodimethyl cyclobutane. Permeation measurements on a membrane element formed from the film by the volumetric procedure (B) gave the following data:

| Gas | Pressure, p.s.i. | Permeability Constant (cB) | Separation Factor |
|---|---|---|---|
| Helium | 50 | 44,900 | $He/CH_4$=49. |
| Methane | 300 | 920 | |
| Hydrogen | 100 | 17,600 | $H_2/CH_4$=19. |
| Oxygen | 140 | 4,140 | |
| Nitrogen | 100 | 1,270 | $O_2/N_2$=3.25. |
| Carbon dioxide | 200 | 6,340 | |

EXAMPLE III

This example illustrates preparation and performance of two separation steps and separation membrane elements of the invention made of a copolymer of perfluoro(2-methylene-4-methyl-1,3-dioxolane) and tetrafluoroethylene. A copolymer of perfluoro(2-methylene-4-methyl-1,3-dioxolane) and tetrafluoroethylene was prepared as follows: Into three 30 ml. Carius tubes, evacuated and chilled to −80° C., there was charged into each tube 10 ml. of perfluorodimethylcyclobutane, 5 ml. measured at −80° C. of tetrafluoroethylene, 5 ml. of perfluoro(2-methylene-4-methyl-1,3-dioxolane) and sufficient nitrogen difluoride as a 2.9% mixture in nitrogen to give a pressure of 10 inches absolute of mercury. The tubes were sealed, brought to room temperature, allowed to stand for 64 hours, and heated at 100° C. for three hours. The product was heated at 120° C. for 20 hours in vacuum to evaporate the reaction solvent. The copolymer gave a hazy non-homogeneous film upon pressing at 275° C. and 300 p.s.i.g. Nine and nine-tenths (9.9) grams of this film was extracted for 8 hours with 130 ml. hexafluorodichlorobutene-2($CF_3CClC{=}C{-}CClCF_3$) to obtain a residue of 2.5 g. which was discarded. The solution was evaporated to dryness and the recovered copolymer was washed with trichloro-trifluoroethane at room temperature and then heated until dry. The recovered copolymer was found by elemental analysis to contain 78 weight percent of tetrafluoroethylene monomer units and 22 weight percent perfluoro (2-methylene-4-methyl-1,3-dioxolane) monomer units by [infra-red] analysis. Clear, transparent films were obtained upon pressing at 250° C., 600 p.s.i. Permeation measurements by the Dow Cell procedure (A) made on two membrane elements made from the films gave the following data:

| Gas | Membrane A | | Membrane B | |
|---|---|---|---|---|
| | Permeability Constant, cB | Separation Factor | Permeability Constant, cB | Separation Factor |
| Helium | 34,000 | $He/CH_4$=1,310 | 12,500 | $He/CH_4$=783. |
| Methane | 26 | | 16 | |
| Hydrogen | 4,700 | $H_2/CH_4$=181 | 2,700 | $H_2/CH_4$=169. |
| Oxygen | 480 | | 310 | |
| Nitrogen | 110 | $O_2/N_2$=4.35 | 61 | $O_2/N_2$=5.1. |

EXAMPLE IV

This example illustrates preparation and performance of a separation step and a separation membrane structure of this invention made of a different copolymer. Into a 330 ml. shaker tube at −80° C. there was charged 153 ml. of trichloro-trifluoroethane, $CCl_2FCClF_2$, 0.15 gm. of $(C_2F_5COO)_2$, 24.4 gm. perfluoro(2-methylene-4-methyl-1,3-dioxolane) and between 30 and 35 gm. of tetrafluoroethylene. The tube was agitated and brought to 40–50° C. at which temperature polymerization occurred rapidly. Fifty-seven (57) gm. of polymer were obtained which were compression molded at 225° C. and 600 p.s.i. into clear, transparent, colorless, tough films. By elemental analysis, the copolymer was found to contain 81 mole percent (63.6 weight percent) of tetrafluoroethylene monomer units and 19 mole percent (36.4 weight percent) of perfluoro(2-methylene-4-methyl-1,3-dioxolane) monomer units.

A film of a copolymer of perfluoro(2-methylene-4-methyl-1,3-dioxolane) and tetrafluoroethylene prepared as described in the preceding paragraph gave the following data using permeation measurements by the Dow Cell procedure (A):

| Gas | Permeability Constant, cB | Separation Factor |
|---|---|---|
| Helium | 6,500 | $He/CH_4$=240. |
| Methane | 27 | |
| Hydrogen | 1,600 | $H_2/CH_4$=59. |
| Oxygen | 290 | |
| Nitrogen | 83 | $O_2/N_2$=3.5. |

EXAMPLE V

This example illustrates preparation and performance of a separation step and separation membrane structure of this invention made from a terpolymer. A film of a terpolymer of perfluoro(2-methylene-4-methyl-1,3-dioxolane), tetrafluoroethylene, and perfluoromethyl perfluorovinyl ether was prepared as follows: Into an evacuated, 30 ml. Carius tube at −80° C., there was charged 10 ml. of perfluorodimethyl cyclobutane, 2 ml. of perfluoro(2-methylene-4 - methyl - 1,3 - dioxolane), 2 ml. at −80° C. of tetrafluoroethylene, and 5 ml., measured at −80° C. of perfluoromethyl perfluorovinyl ether; the evacuated tube was charged with approximately $10^{-4}$ moles of nitrogen difluoride in nitrogen. The sealed tube was held at 25° C. for 16 hours and then heated 20 hours at 100° C. There was obtained 4.7 gm. of polymer which was compression molded at 175° C. and 600 p.s.i. into a tough, transparent, clear, colorless film. The tensile strength at 23° C. was 3020 p.s.i. with an ultimate elongation of 180%. By analysis, the copolymer contained 65 weight percent tetrafluoroethylene monomer units, 18 weight percent perfluoro(2-methylene-4-methyl-1,3-dioxolane) monomer units and 17 weight percent perfluoromethyl perfluorovinyl ether monomer units.

Permeation measurements by the Dow Cell procedure (A) gave the following data:

| Gas | Permeability Constant, cB | Separation Factor |
|---|---|---|
| Helium | 25,000 | He/CH$_4$=735. |
| Methane | 34 | |
| Hydrogen | 3,600 | H$_2$/CH$_4$=106. |
| Oxygen | 380 | |
| Nitrogen | 110 | O$_2$/N$_2$=3.45. |

EXAMPLE VI

In another test of the performance of a separation step and separation membrane, in which a copolymer of perfluoro(2-methylene-4 - methyl - 1,3 - dioxolane) (66% by weight) and tetrafluoroethylene (34% by weight) was used to form the membrane, the following data resulted:

| Gas | Permeability Constant, cB | Separation Factor |
|---|---|---|
| Helium | 21,000 | He/CH$_4$=256. |
| Methane | 82 | |
| Hydrogen | 5,000 | H$_2$/CH$_4$=61. |
| Oxygen | 750 | |
| Nitrogen | 200 | O$_2$/N$_2$=3.8. |

The results of the separation performances given in the examples are summarized in Table A. The separation performance for what has been recognized by the prior art as one of the best helium separation membranes, formed of a copolymer of 85% by weight tetrafluoroethylene (TFE), 15% hexafluoropropylene (HFP), is also indicated in the table for purposes of comparison. The information regarding the performance of this TFE–HFP copolymer in helium separation appears in an article at pages 49–60 of the February 1965 issue of the Industrial and Engineering Chemistry Magazine.

Figure 6:
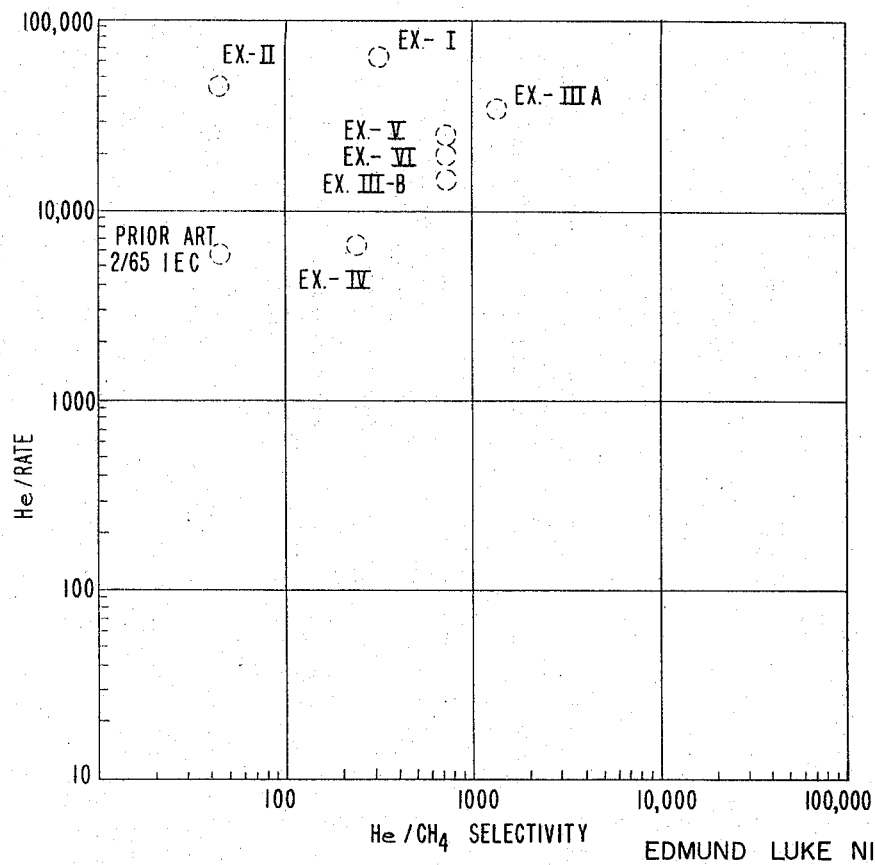
FIGURE 6 is a graphical showing illustrating for a given separation significant aspects of performance of an arrangement embodying the present invention and of an arrangement representing the prior art.

The permeation rate and selectivity data relating to He/CH$_4$ separations for the indicated examples and the prior art information are shown in FIGURE 6.

From both the data of Table A and FIGURE 6, it is believed that the marked superiority of the separation step and separation membrane element of this invention is apparent, not only as to permeation rates but on the basis of permeation rates at excellent levels of selectivity.

The performance of the novel separation step and novel separation element of this invention is a tremendous and surprisingly great improvement over the prior art and represents a very useful commercial and technical advantage of great significance in the field of gas separations using the selective or differential permeation principle.

TABLE A

| Example | Membrane Composition | Permeation Rates, cB | | | | | Separation Factors | | |
|---|---|---|---|---|---|---|---|---|---|
| | | He | CH$_4$ | H$_2$ | O$_2$ | N$_2$ | He/CH$_4$ | H$_2$/CH$_4$ | O$_2$/N$_2$ |
| I | 100% PMD | 64,800 | 198 | 23,700 | 4,030 | 970 | 327 | 120 | 4.2 |
| II | 100% PMD | 44,900 | 920 | 17,600 | 4,140 | 1,270 | 49 | 19 | 3.3 |
| III–A | 22% PMD/78% TFE | 34,000 | 26 | 4,700 | 480 | 110 | 1,310 | 181 | 4.6 |
| III–B | 22% PMD/78% TFE | 12,500 | 16 | 2,700 | 310 | 61 | 783 | 169 | 5.1 |
| IV | 36% PMD/64% TFE | 6,500 | 27 | 1,600 | 290 | 83 | 240 | 59 | 3.5 |
| V | 18% PMD/65% TFE/17% PPVE | 25,000 | 34 | 3,600 | 380 | 110 | 735 | 106 | 3.5 |
| VI | 66% PMD/34% TFE | 21,000 | 82 | 5,000 | 750 | 200 | 256 | 61 | 3.8 |
| Prior Art 2/65 IEC | 85% TFE/15% HFP | 6,200 | 140 | | | 250 | 44 | | |

One surprising aspect of this invention or discovery is the ability of the separation arrangement of the invention, viewed either in process or apparatus terms, to not only permit increased rates of permeation (compared with the prior art) for a first group of certain gases, such as those of smaller molecular size than methane, for example; but at the same time permit or cause a decrease in the permeation rates (compared with the prior art) for a second group of gases of larger molecular size such as methane, for example. This, of course, makes possible more efficient and faster separations particularly of mixtures containing a gas of the first group and one or more of the second group, examples of which can readily be seen in the preceding information.

In addition, when handling gas separations such as those which remove the very small fraction of helium present in some natural gases, in which there is a very high volume of input gas, the remarkable functioning of the process and apparatus of this invention in the area of permeation rates alone simplifies the construction of the separation arrangement used by reducing the size or number of first stage separation devices by a factor of as high as 10 for handling a given volume of input gas. Even if selectivity decreased somewhat with this permeation rate increase, it would be significant, but where selectivity is also improved, the total number or size of stages following the first stage in a given system may be reduced as can the amount of permeate recycling. The invention may be considered of special importance in the early or first stages of a multistage separation system.

Another unusual aspect, apparent from the data regarding the separations relating to this invention has to do with the fact that while the homopolymer material of perfluoro-(2-methylene-4-methyl-1,3-dioxolane) gives excellent selectivity at high improved levels of permeability rate for a He/CH$_4$ separation, and while ordinary fluorinated materials known to the prior art, such as polytetrafluoroethylene for example, give a certain level of selectivity at a certain level of permeation rate for a He/CH$_4$ separation; certain combinations of these materials in the same polymeric composition give selectivities, or separation factors, for the He/CH$_4$ separation which are significantly greater than that achieved by either component alone.

The scope of the invention is not to be limited by the foregoing specific examples and descriptions, but rather is to be determined by the following claims.

What is claimed is:

1. An improved differential permeation process for separating gases which comprises in combination the following steps; bringing an initial gas mixture containing one gas selected from the group consisting of helium, hydrogen, oxygen, nitrogen, carbon dioxide, nitrous oxide, and argon; and at least one other gas of larger molecule size, into contact with one surface of a permeable membrane structure at a given pressure, causing a portion of said mixture to permeate through said membrane structure, collecting at another surface of said membrane structure at a lower pressure a permeated mixture corresponding generally to said initial gas mixture, and removing the permeated mixture from said another surface, while maintaining said membrane structure as a non-porous three-dimensional mass of a polymeric composition comprising repeating units of perfluoro-(2-methylene-4-methyl-1,3-dioxolane) and from 0% to about 90% by weight free-radical, polymerizable, unsaturated, halogenated, hydrocarbon repeating units, through which said one gas permeates at a significantly greater rate than the other components of said initial mixture, with said composition said hydrocarbon repeating units being tetrafluoroethylene units.

2. In an improved differential permeation process for separating one gas selected from the group of gases consisting of helium, hydrogen, oxygen, nitrogen, carbon dioxide, nitrous oxide, and argon from an initial mixture of gases containing said one gas and at least one other gas of larger molecular size, said process comprising moving such an initial mixture of gases into contact with one surface of a non-porous permeable membrane structure at a given pressure, causing a portion of said mixture to permeate through said membrane structure, collecting at another surface of said membrane structure at a lower pressure, a permeated mixture enriched in said one gas, and removing said permeated mixture from said another surface; the improvement comprising causing said portion of said initial mixture to permeate through a membrane structure formed of a polymeric composition comprising repeating units of perfluoro-(2-methylene-4-methyl-1,3 dioxolane) and from 0% to about 90% by weight free-radical, polymerizable, unsaturated halogenated hydrocarbon repeating units said halogenated hydrocarbon repeating units being tetrafluoroethylene units.

3. The improved process of claim 2 in which the group of gases consists of helium and hydrogen and the weight percent of the tetrafluoroethylene units is about 80%.

4. An improved differential permeation apparatus for separating one gas selected from the group comprising helium, hydrogen, oxygen, nitrogen, carbon dioxide, nitrous oxide, and argon from an initial mixture of gases containing said one gas and at least one other gas of larger molecular size, said apparatus comprising in combination a gas-tight housing means defining an enclosed gas separation zone, said apparatus further comprising at least one permeable non-porous membrane structure in said housing means, said membrane structure formed of a polymeric composition comprising repeating units of perfluoro-(2-methylene-4-methyl - 1,3 - dioxolane) and from 0% to about 90% by weight free-radical, polymerizable, unsaturated, halogenated, hydrocarbon repeating units, a second means cooperating with said housing means and each said membrane structure to support said structure in operative relationship in said gas separation zone, said apparatus further comprising a third means cooperating with said housing means for directing an initial gas mixture at a given pressure against one surface of said membrane structure, and a fourth means for collecting and removing a permeated mixture at a lower pressure from another surface of said membrane structure said hydrocarbon repeating units being tetrafluoroethylene units.

References Cited by the Examiner

UNITED STATES PATENTS

| 2,159,434 | 5/1939 | Frey | 55—16 X |
| 3,010,536 | 11/1961 | Plurien et al. | 55—158 |
| 3,062,905 | 11/1962 | Jennings | 55—16 X |
| 3,246,449 | 4/1966 | Stern et al. | 55—158 X |

OTHER REFERENCES

Brubaker et al.: Separation of Gases by Plastic Membranes, in Industrial and Engineering Chems., 46 (4), pp. 733–739, April, 1954.

Norton, F. J.: Permeation of Gases Through Solids, in Journal of Applied Physics 28 (1), pp. 34–39, January, 1957, p. 38 relied on.

Waters, C. J.: Process Natural Gas by Permeation, in Petroleum Refiner, 38 (5), pp. 147–150, May, 1959.

Stern et al.: An Improved Permeability Apparatus, in Modern Plastics 42 (2), pp. 154–158, October, 1964.

REUBEN FRIEDMAN, *Primary Examiner.*

J. ADEE, *Assistant Examiner.*